United States Patent

Tracy

(10) Patent No.: US 6,715,352 B2
(45) Date of Patent: Apr. 6, 2004

(54) METHOD OF DESIGNING A FLEXURE SYSTEM FOR TUNING THE MODAL RESPONSE OF A DECOUPLED MICROMACHINED GYROSCOPE AND A GYROSCOPED DESIGNED ACCORDING TO THE METHOD

(75) Inventor: Michael J. Tracy, Aliso Viejo, CA (US)

(73) Assignee: Microsensors, Inc., Costa Mesa, CA (US)

( * ) Notice: Subject to any disclaimer, the term of this patent is extended or adjusted under 35 U.S.C. 154(b) by 110 days.

(21) Appl. No.: 09/893,329

(22) Filed: Jun. 26, 2001

(65) Prior Publication Data

US 2003/0000305 A1 Jan. 2, 2003

(51) Int. Cl.[7] .................................................. G01P 9/02
(52) U.S. Cl. .................................. 73/504.02; 73/504.11; 73/507
(58) Field of Search ......................... 73/504.02, 504.03, 73/504.04, 504.08, 504.18, 504.11, 507

(56) References Cited

U.S. PATENT DOCUMENTS

| 3,943,778 | A | * | 3/1976 | Wyse ............................ 74/5 F |
| 4,030,374 | A | * | 6/1977 | Bulman et al. ................ 74/5 F |
| 5,016,072 | A | | 5/1991 | Greiff |
| 5,203,208 | A | | 4/1993 | Bernstein |
| 5,208,653 | A | * | 5/1993 | Mark et al. .................. 356/467 |
| 5,349,855 | A | | 9/1994 | Bernstein et al. |
| 5,359,893 | A | | 11/1994 | Dunn |
| 5,408,877 | A | | 4/1995 | Greiff et al. |
| 5,488,862 | A | | 2/1996 | Neukermans et al. |
| 5,535,902 | A | | 7/1996 | Greiff |
| 5,555,765 | A | | 9/1996 | Greiff |
| 5,600,064 | A | * | 2/1997 | Ward |
| 5,604,311 | A | * | 2/1997 | Kumar et al. ............. 73/504.14 |
| 5,698,784 | A | * | 12/1997 | Hotelling et al. ......... 73/504.16 |
| 5,955,668 | A | | 9/1999 | Hsu et al. |
| 6,009,751 | A | * | 1/2000 | Ljung ....................... 73/504.02 |
| 6,109,105 | A | * | 8/2000 | Kubena et al. ........... 73/504.15 |
| 6,244,111 | B1 | * | 6/2001 | Funk ........................ 73/504.13 |
| 6,308,567 | B1 | * | 10/2001 | Higuchi et al. ........... 73/504.12 |
| 6,349,597 | B1 | * | 2/2002 | Folkmer et al. .......... 73/504.02 |
| 6,401,536 | B1 | * | 6/2002 | O'Brien .................... 73/514.38 |
| 6,443,008 | B1 | * | 9/2002 | Funk et al. ............... 73/504.12 |
| 6,516,666 | B1 | * | 2/2003 | Li ............................ 73/504.12 |

* cited by examiner

Primary Examiner—Helen Kwok
Assistant Examiner—Jacques M Saint-Surin
(74) Attorney, Agent, or Firm—Myers Dawes Andras & Sherman LLP; Joseph C. Andras

(57) ABSTRACT

For a decoupled to gyro to have high sensitivity to angular rate, it is necessary to have the design flexibility to achieve all the critical frequencies in the design. The geometry of the gyro is first estimated and is followed by a performance analysis to maximize the gyro sensitivity. If the performance requirements cannot be met, the next iteration is started by a new estimate of the geometry. For a given design iteration, the desired modal response is implemented with a predetermined or given gyro flexure system. The flexure system disclosed here has enough independent design parameters to allow the desired modal response required for high gyro performance to be selected by independent design choice of the available geometric and configurational design parameters of the gyroscope.

8 Claims, 3 Drawing Sheets

METHOD OF DESIGNING A FLEXURE SYSTEM FOR TUNING THE MODAL RESPONSE OF A DECOUPLED MICROMACHINED GYROSCOPE AND A GYROSCOPED DESIGNED ACCORDING TO THE METHOD

BACKGROUND OF THE INVENTION

1. Field of the Invention

This invention relates to a method and apparatus for tuning the modal response of a decoupled micro-machined gyroscope. In a decoupled gyro, there are multiple vibration modes that are instrumental in the gyro performance. To reach the maximum performance of the gyro it is necessary to independently tune, or set the frequency of, these vibration modes.

2. Description of the Prior Art

This invention relates to sensing devices which utilize the gyroscopic principle, i.e., measuring the Coriolis force created by the conservation of momentum of a moving body. Specifically, the invention concerns devices called micro-gyros, which are small and inexpensive. They rely on conservation of momentum of a structure having limited oscillation motion, rather than full rotation. They are able to withstand rough environments for long periods of time.

In this field, the terms used to describe the directions of motions and of forces can be confusing. Applicant in describing and claiming the present invention will refer to the three separate directions (which are orthogonally related to one another) as follows: (a) the driven element, which is cause to oscillate at a predetermined, arbitrary rate inside the gyro, moves around the drive axis; (b) the velocity of the gyro environment, which is to be determined by the gyro, is around the rate axis; and (c) the Coriolis force, which is a function of the velocity of the gyro environment, is measured by motion of a sensing element around the output axis.

A number of patents have been issued to the Charles Draper Laboratory for such micro-gyro sensors, including U.S. Pat. Nos. 5,016,072; 5,203,208; 5,349,855; 5,408,877; 5,535,902; and 5,555,765. The earliest of the listed Draper patents refers to "U.S. Pat. No. 4,598,585 to Boxenhorn, which discloses a planar micro-mechanical vibratory gyroscope adapted for small geometry configurations which may be constructed using semiconductor fabrication mass production techniques".

In Draper U.S. Pat. No. 5,016,072, a single element mass is supported by a system of flexible linkages, made of semiconductor material, to allow for movement in two axes. A system of electrodes drives the mass to vibrate in one axis, and senses the motion of the mass due to Coriolis force in another axis. In another patent issued to Draper, U.S. Pat. No. 5,203,208, the same concept is extended to a symmetrical support linkage system. Draper U.S. Pat. No. 5,349,855 is another micro gyro design wherein an element mass is supported by a system of flexures. The element is driven laterally, and reacts rotationally due to Coriolis force. U.S. Pat. No. 5,408,877 issued to Draper relies on moving a single proof mass along one linear axis, and senses the motion of the same element along an orthogonal axis due to Coriolis force. Draper U.S. Pat. No. 5,555,765 shows a micro gyro using a single mass element formed into the shape of a wheel. By oscillating the wheel mass, a rotation about an axis normal to the plane of the wheel will create Coriolis force that will tilt the wheel.

U.S. Pat. No. 5,359,893 issued to Motorola uses a pair of elements supported in an "H-shaped" linkage frame so that angular velocity can be measured in two perpendicular axes. U.S. Pat. No. 5,488,862 of Neukermans et al involves a design with an outer torsional frame that is excited to tilt about an axis in the plane of the frame; an inner frame responds to the Coriolis force by oscillating (and carrying with it the outer frame) in an axis orthogonal to the outer frame axis. Both the drive and the sensing mechanisms rely on piezo-voltage actuators and sensors mounted on the hinges. In addition to the listed patents, substantial micro-gyro work has been done by the Berkeley Sensor and Actuator Center.

There are several significant defects in the prior art micro-gyros. With the exception of U.S. Pat. No. 5,488,862, reliance is on a single mass element for both driving and sensing functions. This coupling of the driving and output motion severely limits the sensitivity of the gyro. For example, as the single element is driven to vibrate, a key parameter that affects the driving mechanism is the alignment between the element and the drive electrodes. In the presence of an angular rate, the Coriolis force will create a secondary motion on the same element, thereby disturbing the alignment between the mass and the driving electrodes. Complex control schemes are necessary to compensate for such undesirable motions.

Furthermore, with only a single mass element, it is difficult to match the two resonant frequencies. Corrections are limited to support linkages only; any correction made to the mass element will alter both driving and output resonance simultaneously. Another complication is that the proximity of a single element to multiple electrodes leads to stray capacitance and coupled electric fields that are significant sources of electrical noise.

In U.S. Pat. No. 5,488,862, although two elements are used, the design does not allow for independent movement of each element. The outer frame is rigidly connected to the inner frame, so that the two frames essentially behave as a single mass element. When the inner frame rotates, the outer frame rotates with it. Another shortcoming in that design is that the outer frame has severely limited movement, due to typically very small thickness spaces (usually micro meters) in micromachining. The limited rotation of the frame results in low angular momentum, and hence low gyro sensitivity.

In all prior art designs there is also a lack of ability to electronically correct for imbalances of the system due to manufacturing tolerances. The problem is worsened by the use of a single element for drive and output motions. Since the same physical element is driven and sensed, due to mechanical coupling any forces used to balance the mass will often generate undesirable signals that corrupt the intended signal. For the same reason, self-testing of the micro gyro in prior art designs is very difficult.

In response to these limitations the assignee of the present application developed a multi-element gyro as disclosed in U.S. Pat. No. 5,955,668. The gyro disclosed there essentially separates the mass (momentum of inertia) of the constant motion element driven to oscillate around the drive axis from the mass (momentum A of inertia) of the variable motion sensing element which creates the measured force. This may be accomplished using: (a) an outer ring-shaped element which oscillates around the drive axis, and (b) an inner disk-shaped element which oscillates, or rocks, around the output axis as a result of the Coriolis effect. The torque around the output axis may be measured by any suitable means, such as capacitance, magnetic force, piezoelectric or piezoresitive effect, or optical signals. The dual-element configuration permits matching of the resonant frequency of the ring in its oscillation with the resonant frequency of the disk in its rocking. The dual-element structure also permits the ring and the disk to be excited independently, so that each can be dynamically compensated for manufacturing tolerances by counterbalancing. The sensing element, e.g., the disk, may be supported by a pair of hinges, or flexures, that permit tilting about an axis formed by these hinges. The hinges are connected to posts, or "anchors" which support the entire device on a substrate. The hinges provide mechanical isolation of the gyro from the stresses in the substrate. The design of the anchor hinges can be modified to accommodate either single or dual-axis sensing. The essential separation of the driven element from the sensing element may also be accomplished using outer and inner rectangular-shaped elements, which are caused to move, respectively, in linear directions along two orthogonal directions.

However, the nature of the flexures or hinges also affects what range of frequencies can be realized within the optimum performance ranges of the driven and sense masses, i.e. the disk and ring masses. Changing a design parameter in one changes in the ranges possible frequencies for the other despite the fact that they can be independently excited. Therefore, what is needed is some type of design wherein a decoupled gyro can be more freely designed so that a design parameter in one of the decoupled masses can be chosen without necessarily restricting the design parameters which can be chosen in the other one of the decoupled masses.

BRIEF SUMMARY OF THE INVENTION

The invention is a method of setting the drive and sense frequencies of a gyroscope having a drive mass and a sense mass which are coupled together by a flexure assembly. The method comprises the steps of selecting a drive stiffness, $K_d$. Geometric parameters of the flexure assembly are selected to obtain a desired drive frequency, $\omega_d$. At least one configurational parameter of the flexure assembly is selected to obtain a desired sense frequency, $\omega_s$. The gyroscope is then evaluated to determine if it has obtained desired performance and size envelope characteristics. If it has not, then the steps of selecting a drive stiffness, $K_d$, selecting geometric parameters of the flexure assembly to obtain a desired drive frequency, $\omega_d$, and selecting a configurational parameter of the flexure assembly to obtain a desired sense frequency, $\omega_s$, are repeated until it is determined that the gyroscope has obtained desired performance and size envelope characteristics.

The step of selecting geometric parameters of the flexure assembly to obtain a desired drive frequency, $\omega_d$, comprises the step or steps of selecting length and/or width of at least one individual flexure within the flexure assembly. In the illustrated embodiment the selection of length and width of at least one individual flexure within the flexure assembly comprises selecting length and/or width of each individual flexure within the flexure assembly. Also in the illustrated embodiment the step of selecting a configurational parameter of the flexure assembly to obtain a desired sense frequency, $\omega_s$, comprises the step of selecting an orientation of at least one flexure within the flexure assembly relative to other ones of the flexures with the flexure assembly.

Again in the illustrated embodiment the individual flexures within the flexure assembly are oriented symmetrically about an axis of symmetry of the gyroscope. The step of selecting an orientation of at least one flexure within the flexure assembly relative to other ones of the flexures with the flexure assembly comprises the step of selecting one of a possible number of orientations of at least one flexure to the axis of symmetry of the gyroscope. In particular, the flexure assembly includes at least one pair of flexures. The step of selecting a configurational parameter of the flexure assembly to obtain a desired sense frequency, $\omega_s$, comprises selecting an angle which the pair of flexures makes to each other. Still more specifically, in the illustrated embodiment the flexure assembly comprises two diametrically opposing pairs of flexures and where selecting an angle which the pair of flexures makes to each other comprises setting a dihedral angle between each of the flexures of the two diametrically opposing pairs.

In the illustrated design the step of selecting geometric parameters of the flexure assembly to obtain a desired drive frequency, $\omega_d$, comprises selecting length, L, and width, w, of four flexures formed into two pairs comprising the flexure assembly, according to the equation $$\omega_d^2 = \frac{4Ew^3 tR^2}{12L^3 I_d}$$

where E is the Young's modulus of the flexure. t is the process thickness of the flexure. $I_d$ is the rotational moment of inertia of the drive mass about a rate axis. and R is the radius of the drive mass where the drive mass is a ring-shaped mass.

In the same situation the step of selecting a configurational parameter of the flexure assembly to obtain a desired sense frequency, $\omega_s$, comprises selecting θ according to the equation $$\omega_s^2 = \frac{4Ewt^3 \sin\theta R^2}{12L^3 I_s}.$$

The invention further includes the improved gyroscope which is designed by the above method.

While the method has been described for the sake of grammatical fluidity as steps, it is to be expressly understood that the claims are not to be construed as necessarily limited in any way by the construction of "means" or "steps" limitations under 35 USC 112, but to be accorded the full scope of the meaning and equivalents of the definition provided by the claims whether by the judicial doctrine of equivalents or by statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

For the decoupled gyro to have high sensitivity to angular rate, it is necessary to have the design flexibility to achieve all the critical frequencies in the design. The design of a gyro is an iterative approach. The geometry of the gyro is first estimated and is followed by a performance analysis to maximize the gyro sensitivity. If the performance requirements cannot be met, the next iteration is started by a new estimate of the geometry.

The gyro performance, or sensitivity, is mainly determined by its modal response or responses. For a given design iteration, the desired modal response is implemented with a predetermined or given gyro flexure system. The flexure system disclosed here has enough independent design parameters to allowed the desired modal response required for high gyro performance to be obtained.

Figure 1:
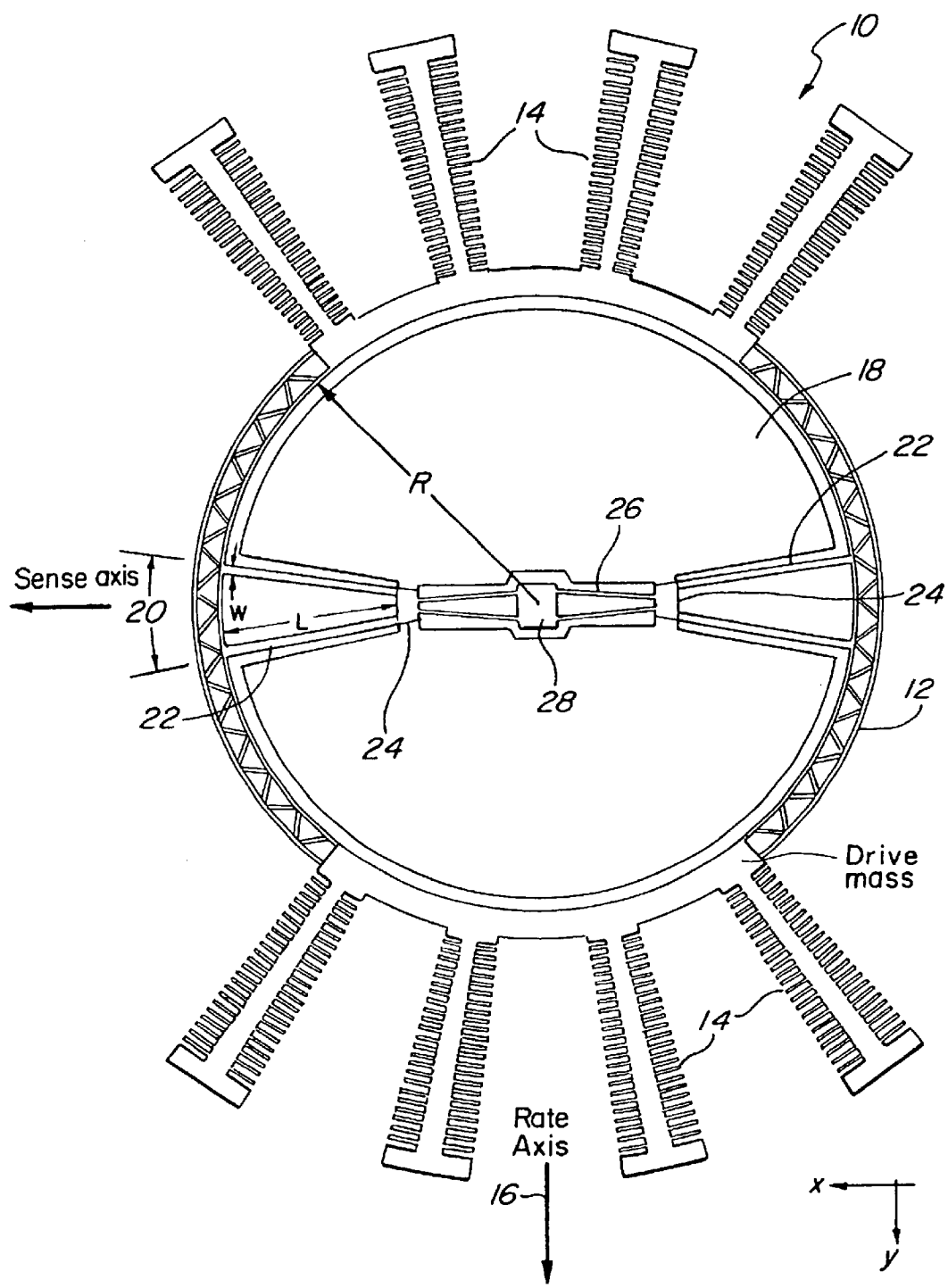
FIG. 1 is a plan view of the gyro showing the salient features of the flexure system.
Figure 2:
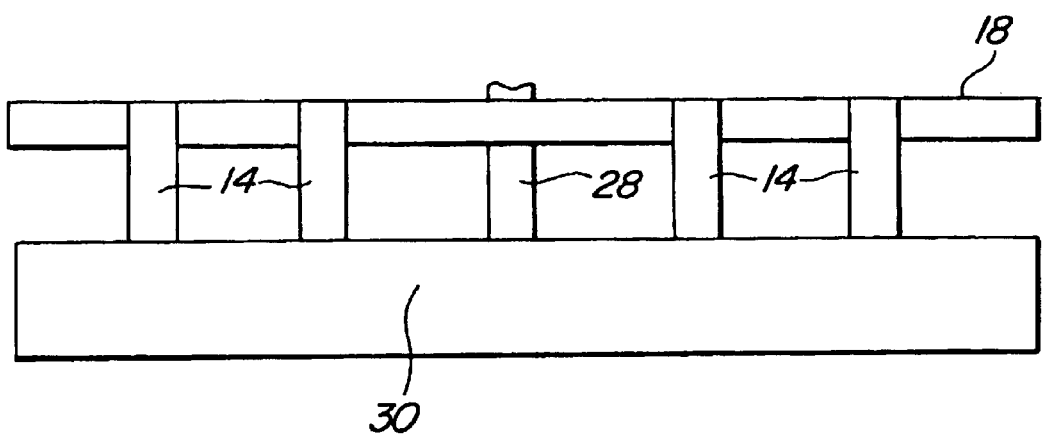
FIG. 2 is a side cross-sectional view of the gyro of FIG. 1.

The top plan view of FIG. 1 illustrates one embodiment in which the invention is realized. A ring shaped drive mass 12 is coupled by two pairs of diametrically opposing flexures 22 to corresponding bridges 24. Flexures 22 for a dihedral or V-shaped pair. As shown in FIG. 1, L is the length of flexure 22, w is the flexure width, and $\theta$ is the inclusive angle defined by the dihedral or V-shaped arrangement of flexures 22, the angle which one flexure 22 makes with its opposing flexure 22 of the pair being $2\theta$. R is the inner radius of drive mass 12. Bridges 24 in turn are coupled to or form part of a bifurcated disk shaped sense mass 18, which is disposed within ring shaped drive mass 12. Bridges 24 are coupled by two pairs of flexures 26 to an anchor post 28. Anchor post 28 is connected to an underlying basal substrate 30 shown in the side elevational view of FIG. 2 above which the elements of FIG. 1 are suspended by means of anchor post 28 and flexures 26 and 22. A plurality of diametrically opposed and circumferentially arranged drive elements 14, having one movable portion, are coupled to ring shaped drive mass 12. The opposing fixed portion of drive elements 14 are coupled to or fixed relative to underlying substrate 30 whereby a rotational force can be applied from drive elements 14 onto ring shaped drive mass 12. The elements of FIGS. 1 and 2 can be made virtually of any material and are often made from silicon, polymer, insulators, metals or other microlithographic materials and combinations of the same.

Inertial mass 12 of microgyro 10 is rotated about the Z axis, which extends perpendicularly to the plane of FIG. 1, by a plurality of conventional digitated driving electrodes 14. An acceleration about the rate axis 16, the Y axis for example, will cause a rocking of sense mass 18 about the sense axis 20, the X axis in this case. A resulting Coriolis torque about the X axis will be generated, and the Coriolis force or torque is coupled by flexures 22 into sensing mass 18. The displacement of the sensing mass 18 may be detected using conventional electrostatic sense electrodes (not shown) located underneath the sensing mass 22. The means by which drive mass 12 is driven or sense mass 18 sensed is not material to the invention and any other type of driving or sensing mechanism now known or later devised may be substituted with complete equivalency.

The important design features of the modal responses of a gyro 10 are the drive mode and the sense mode. The drive mode is defined as the natural frequency of drive mass 12 about the Z drive axis. The sense mode is the natural frequency of the sense mass 18 about the X sense axis. The drive frequency is the operational frequency of gyroscope 10. The difference between the sense frequency and the drive frequency determines the rate sensitivity for a particular class of gyro 10.

In detail, the stiffness of the flexure system, flexures 22 and their connected structures, is calculated using the moments-of-inertia of the overall geometry of gyro 10 and the desired modal response from its performance analysis, which can be calculated using finite element analysis. The flexure stiffnesses, $K_d$ and $K_s$, are calculated using:

$$K_d = \omega_d^2 I_d$$
$$K_s = \omega_s^2 I_s \quad (1)$$

Where $I_d$ is the mass moment-of-inertia of the drive mass about the Z drive axis in FIG. 1 and $I_s$ is the moment-of-inertia of the sense mass 18 about the X sense axis. These stiffnesses can be calculated from the geometric design parameters w, $\theta$, and L in the embodiment of FIG. 1 using:

$$K_d = \frac{4Ew^3tR^2}{12L^3} \quad (2)$$
$$K_s = \frac{4Ewt^3\sin\theta R^2}{12L^3}$$

The process thickness, t, of the fabricated elements of FIG. 1 which is a fixed parameter of the foundry in which gyro 10 is made, and Young's modulus, E, is a fixed property of the material of which the elements of FIG. 1 are made. It is to be understood of course that the details of the geometry of gyro 10 will determine the form of the equations by which stiffness of flexures 22 are related to the geometric design parameters.

Figure 3:
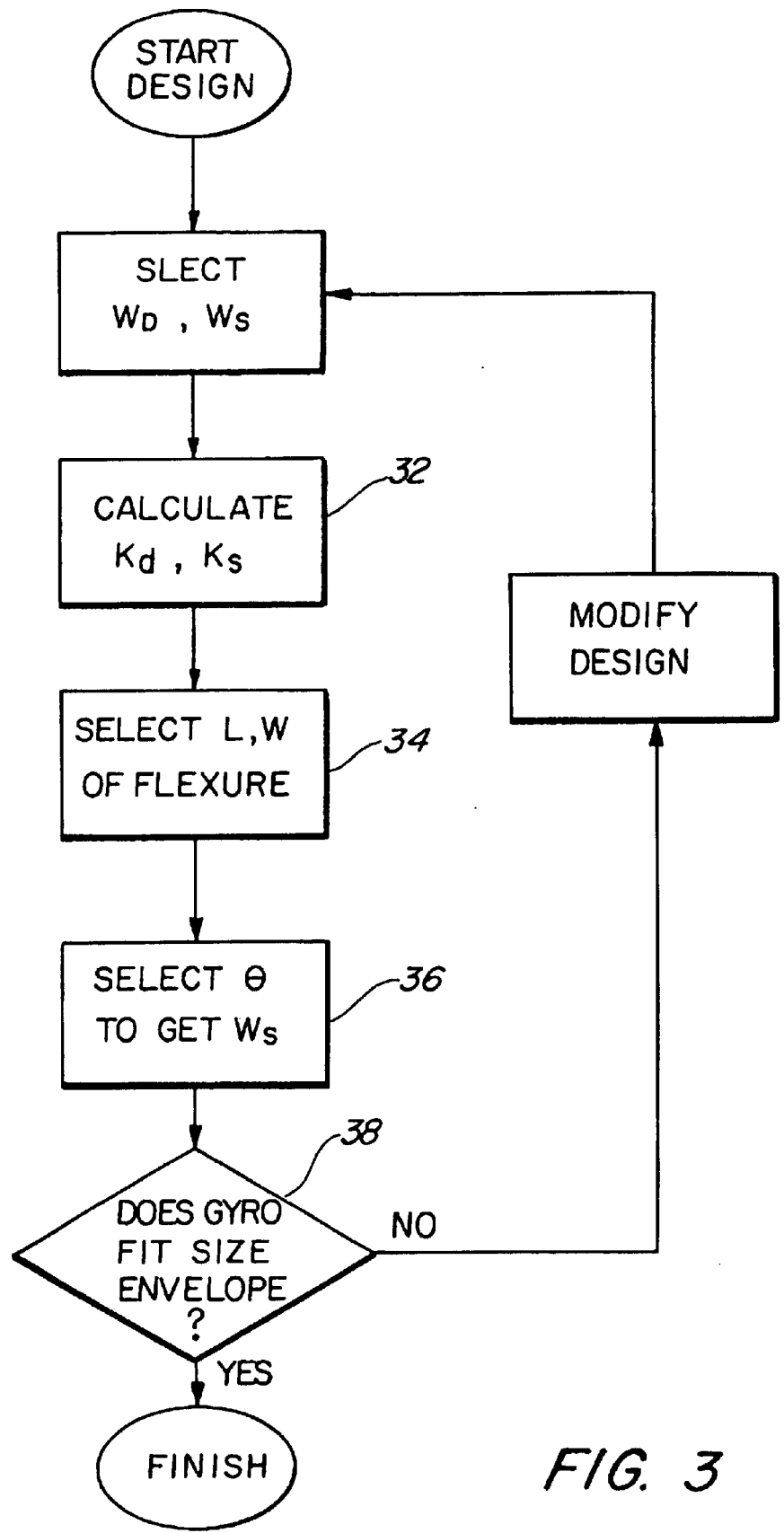
FIG. 3 is a flow diagram of the design process followed to set drive and sense frequencies in the gyro of FIGS. 1 and 2.

As shown in FIG. 3 the procedure to design the flexures 22 starts at step 32 with a selection of the drive stiffness, $K_d$. The length, L, and the width, w, of flexures 22 are chosen to meet the desired drive frequency, $\omega_d$ at step 34 according to equation (1). In the next step 36, the inclusive angle, $\theta$, of flexures 22 is chosen to obtain the desired sense stiffness $K_s$. and hence the desired sense frequency, $\omega_s$, according to equation (2). In prior designs the extra degree of design freedom at step 36 provided by a relative free choice of $\theta$ was not available and the design parameters of t, R, L, E and w were set according to the drive frequency, $\omega_d$, obtained. This then would in turn set the sense frequency, $\omega_s$, to a value dictated by these parameters and the geometry of gyro 10. If the sense frequency, $\omega_s$, was not within the desired design range, then $K_d$ would have to changed and a compromised sought until acceptable points for the drive frequency, $\omega_d$, and the sense frequency, $\omega_s$, could be found given the gyro geometry. In the present invention, the dihedral of V-shape of flexures 22 introduces an additional design parameter which can be chosen to allow a greater degree of design choice when selecting the drive frequency, $\omega_d$, and the sense frequency, $\omega_s$. Since gyro 10 must fit within a certain size envelope, a determination is made as to its performance and envelope size at step 38. The next design iteration, if needed, would return to step 32 if the inclusive angle $\theta$ exceeded a design constraint of the gyroscope or its packaging.

While the invention has shown a dihedral angle defining the divergence of flexures 22 as the additional design parameter of choice, it is to be understood that any design parameter relating in any manner to the design or geometry of gyro 10 on one hand and to a flexure stiffness on the other could be equally substituted. Still further, while a sense and drive stiffness of a single flexure assembly, namely two pairs 22 of straight flexure elements have been discussed, it is also within the scope of the invention that the stiffness of different flexures or groups of flexures with different geometries or topologies could be used to derive the sense and drive frequencies of gyro 10.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method of setting the drive and sense frequencies of a gyroscope having a drive mass and a sense mass coupled together by a flexure assembly comprising:
   selecting a drive stiffness, $K_d$;
   selecting geometric parameters of said flexure assembly to obtain a desired drive frequency, $\omega_d$;
   selecting a configurational parameter of said flexure assembly to obtain a desired sense frequency, $\omega_s$; and
   determining whether said gyroscope has obtained desired performance and size envelope characteristics;
   where said flexure assembly includes at least one pair of flexures, and where selecting a configurational parameter of said flexure assembly to obtain a desired sense frequency, $\omega_s$, comprises selecting an angle which said pair of flexures makes to each other; and
   where said flexure assembly comprises two diametrically opposing pairs of flexures and where selecting an angle which said pair of flexures makes to each other comprises setting a dihedral angle between each of said flexures of said two diametrically opposing pairs.

2. A method of setting the drive and sense frequencies of a gyroscope having a drive mass and a sense mass coupled together by a flexure assembly comprising:
   selecting a drive stiffness, $K_d$;
   selecting geometric parameters of said flexure assembly to obtain a desired drive frequency, $\omega_d$;
   selecting a configurational parameter of said flexure assembly to obtain a desired sense frequency, $\omega_s$; and
   determining whether said gyroscope has obtained desired performance and size envelope characteristics;
   where selecting geometric parameters of said flexure assembly to obtain a desired drive frequency, $\omega_d$, comprises selecting length, L, and width, w, of four flexures formed into two pairs comprising said flexure assembly, where $$\omega_d^2 = \frac{4Ew^3tR^2}{12L^3I_d}$$

where E is the Young's modulus of said flexure, t is the process thickness of said flexure, $I_d$ is the rotational moment of inertia of said drive mass about a rate axis, and R is the radius of said drive mass, where said drive mass is a ring-shaped mass.

3. The method of claim 2 where selecting a configurational parameter of said flexure assembly to obtain a desired sense frequency, $\omega_s$, comprises selecting $\theta$ in $$\omega_s^2 = \frac{4Ewt^3\sin\theta R^2}{12L^3I_s}.$$

4. A method of setting the drive and sense frequencies of a gyroscope having a drive mass and a sense mass coupled together by a flexure assembly comprising:
   selecting a drive stiffness, $K_d$;
   selecting geometric parameters of said flexure assembly to obtain a desired drive frequency, $\omega_d$;
   selecting a configurational parameter of said flexure assembly to obtain a desired sense frequency, $\omega_s$; and
   determining whether said gyroscope has obtained desired performance and size envelope characteristics;
   where selecting a configurational parameter of said flexure assembly to obtain a desired sense frequency, $\omega_s$, comprises selecting $\theta$ in $$\omega_s^2 = \frac{4Ewt^3\sin\theta R^2}{12L^3I_s}$$

where E is the Young's modulus of said flexure, t is the process thickness of said flexure, $I_s$ is the rotational moment of inertia of said sense mass about a sense axis, R is the radius of said drive mass, where said drive mass is a ring-shaped mass, L is the length of each flexure within said flexure assembly, and w is the width of each flexure within said flexure assembly which is comprised of four flexures formed into two pairs.

5. An improvement in a gyroscope comprising:
   a drive mass;
   a sense mass; and
   a flexure assembly coupling said drive and sense mass together;

where said drive mass has a selecting drive stiffness, $K_d$ obtained by selecting geometric parameters of said flexure assembly to obtain a desired drive frequency, $\omega_d$; and where said sense mass a sense stiffness $K_s$ obtained by selecting a configurational parameter of said flexure assembly to obtain a desired sense frequency, $\omega_s$, and where said gyroscope has obtained desired performance and size envelope characteristics by independent selection of said geometric and configurational parameters of said flexure assembly;

where said flexure assembly includes at least one pair of flexures, and where said configurational parameter of said flexure assembly selected to obtain a desired sense frequency, $\omega_s$, comprises a selected angle which said pair of flexures makes to each other; and where said flexure assembly comprises two diametrically opposing pairs of flexures and where said angle which said pair of flexures makes to each other comprises a selected dihedral angle between each of said flexures of said two diametrically opposing pairs.

6. An improvement in a gyroscope comprising:

a drive mass;

a sense mass; and a flexure assembly coupling said drive and sense mass together;

where said drive mass has a selecting drive stiffness, $K_d$ obtained by selecting geometric parameters of said flexure assembly to obtain a desired drive frequency, $\omega_d$; and where said sense mass as a sense stiffness $K_s$ obtained by selecting a configurational parameter of said flexure assembly to obtain a desired sense frequency, $\omega_s$, and where said gyroscope has obtained desired performance and size envelope characteristics by independent selection of said geometric and configurational parameters of said flexure assembly; and where said geometric parameters of said flexure assembly selected to obtain a desired drive frequency, $\omega_d$, comprises a length, L, and width, w, of four flexures formed into two pairs comprising said flexure assembly, where $$\omega_d^2 = \frac{4Ew^3tR^2}{12L^3I_d}$$

where E is the Young's modulus of said flexure, t is the process thickness of said flexure, $I_d$ is the rotational moment of inertia of said drive mass about a rate axis, and R is the radius of said drive mass, where said drive mass is a ring-shaped mass.

7. The improvement of claim 6 where said configurational parameter of said flexure assembly selected to obtain a desired sense frequency, $\omega_s$, comprises a selected $\theta$ in $$\omega_s^2 = \frac{4Ewt^3\sin\theta R^2}{12L^3I_s}.$$

8. An improvement in a gyroscope comprising:

a drive mass;

a sense mass; and a flexure assembly coupling said drive and sense mass together;

where said drive mass has a selecting drive stiffness, $K_d$ obtained by selecting geometric parameters of said flexure assembly to obtain a desired drive frequency, $\omega_d$; and where said sense mass as a sense stiffness $K_s$ obtained by selecting a configurational parameter of said flexure assembly to obtain a desired sense frequency, $\omega_s$, and where said gyroscope has obtained desired performance and size envelope characteristics by independent selection of said geometric and configurational parameters of said flexure assembly; and where said configurational parameter of said flexure assembly selected to obtain a desired sense frequency, $\omega_s$, comprises a selected $\theta$ in $$\omega_s^2 = \frac{4Ewt^3\sin\theta R^2}{12L^3I_s}.$$

where E is the Young's modulus of said flexure, t is the process thickness of said flexure, $I_s$ is the rotational moment of inertia of said sense mass about a sense axis, R is the radius of said drive mass, where said drive mass is a ring-shaped mass, L is the length of each flexure within said flexure assembly, and w is the width of each flexure within said flexure assembly which is comprised of four flexures formed into two pairs.

* * * * *